UNITED STATES PATENT OFFICE.

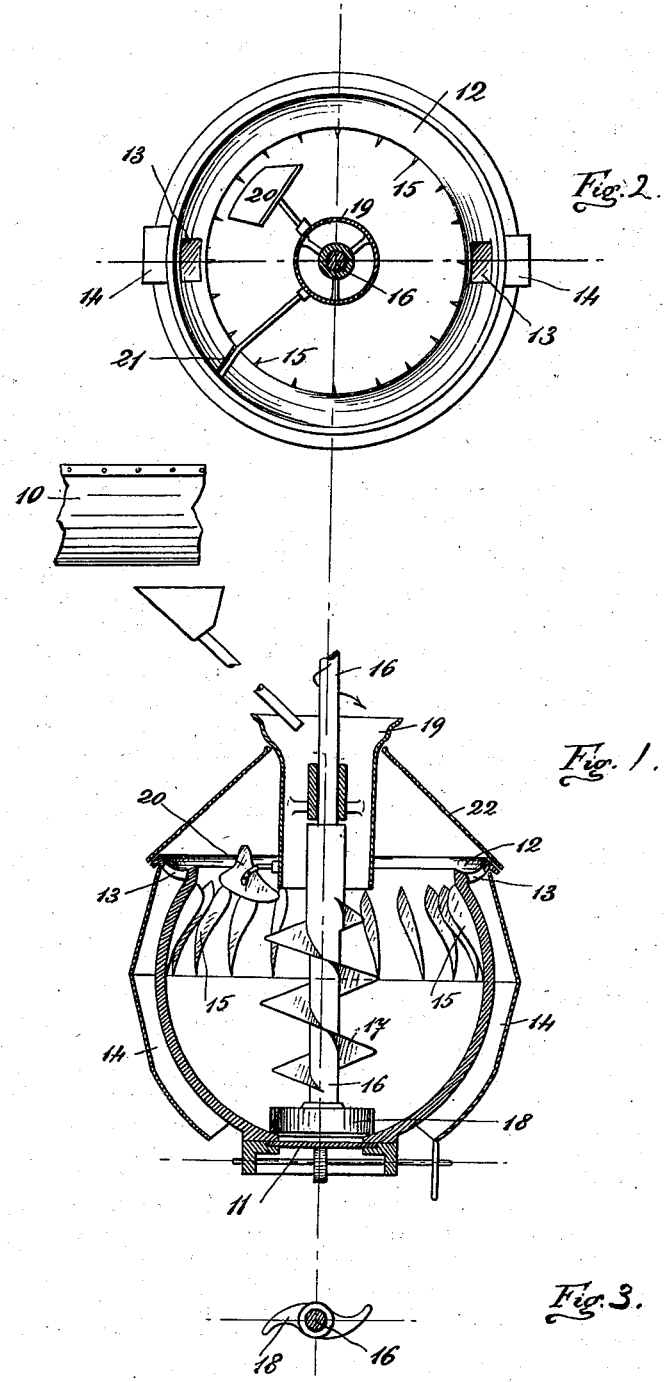

GUGLIELMO BIANCHINI, OF MILAN, ITALY.

APPARATUS FOR TREATMENT OF GRAIN PREPARATORY TO GRINDING.

SPECIFICATION forming part of Letters Patent No. 700,472, dated May 20, 1902.

Application filed May 18, 1899. Serial No. 717,240. (No model.)

*To all whom it may concern:*

Be it known that I, GUGLIELMO BIANCHINI, of Milan, Italy, have invented certain new and useful Improvements in Apparatus for Treatment of Grain Preparatory to Grinding; and I do hereby declare the following to be a full, clear, and exact description of the invention, such as will enable others skilled in the art to which it appertains to make and use the same, reference being had to the accompanying drawings, and to the numerals of reference marked thereon, which form a part of this specification.

This invention relates to an apparatus for the treatment of grain prior to its being ground.

In the following description the expression "grain" is used in the sense of cereals of all kinds which are milled—that is to say, wheat, Indian corn, rye, &c.

Attempts have long been made to obtain a perfect decortication of the grain before milling for the purpose of increasing the proportion of the resulting product which is capable of being placed upon the market and for obtaining flour of exceptional purity by the previous elimination of germs, dust, and the cortical envelop. These efforts have not hitherto met with success, because the decorticating appliances at present in use produce too great a proportion of broken grains or absorb too much power. These defects are obviated by means of the apparatus which forms the subject of this invention. No rupture of the grains takes place, and from one thousand to one thousand two hundred kilograms of grain may be decorticated per hour with a force of three and one-half horse-power, only three per cent. of the weight of the grain being removed. By employing a force slightly greater than this and by moistening the grain rather more than usual an absolutely perfect decortication may be effected.

The treatment to which the grain is submitted is as follows: It is first of all moistened by means of water in a very finely-divided condition, heated slightly and uniformly, more especially in winter, to about 25° centigrade. The grain which has been previously moistened in this manner is then worked by friction upon itself and against the surface of a vessel which is open at its upper portion and contracting from a point at approximately one-half its height toward its upper edge. The grain is delivered from this vessel after having been carried against the cutting-blades, with which the wall of the vessel is provided slightly below its upper aperture. This rubbing of the grain upon itself, against the walls of the vessel, and against the cutting-blades is obtained by causing the grain to descend within the vessel at its central portion and to then ascend along the walls of the vessel, where it comes into contact with the cutting-blades.

In the drawings, Figure 1 is a vertical section of the lower portion of the apparatus where the "decortication" properly so called takes place. Fig. 2 is a plan view as seen from above corresponding to Fig. 1. Fig. 3 is a detail view corresponding to Fig. 1.

The grain is first suitably moistened and conveyed to the vessel in which it is decorticated by the trough 10, for instance. This vessel is open at its upper portion and is traversed by a vertical shaft, to which movement is imparted by any appropriate means. A circular aperture is provided at the lower portion of the vessel and enables it to be completely emptied at the termination of the operation. This aperture is normally closed by means of an obturator 11. The large opening at the upper portion of the vessel, corresponding to a parallel of the sphere, is surrounded by a gutter 12, provided with apertures 13, and terminating in conduits 14. The inner wall of the vessel is provided slightly below the said upper opening with cutting-blades 15 of steel. The shaft 16 is provided with a screw 17, which also has a cutting edge, and with an S-shaped vane 18, of which Fig. 3 is a plan view. The pipe 19, which is attached to the shaft 16 in the manner shown in the drawings or fixed to the sphere, receives the grain conveyed thereto by the trough 10. The shaft 16 imparts motion to the metal scoop 20, which passes along the surface of the cutting-blades 15 and to the leather scoop 21, which adapts itself to the form of the gutter 12, upon the bottom of which it passes. The grain is introduced into the pipe 19 in a uniform and continuous manner, the screw 17 conveying it to the lower part of the apparatus. The vane 18 then directs it toward the walls of the vessel, along which it is forced to ascend. In this manner the grain is worked by the rubbing of the grains one against the other, by friction against the walls of the vessel, and by the cutting action of the screw 17 and of the blades 15. The introduction of the grain through the pipe 19 may be regulated in such a manner that the quantity which enters the vessel is invariably equal to that which issues therefrom at the upper opening and in such a manner that the grain remains in the machine during the time necessary for undergoing complete decortication. Immediately the grain in ascending reaches the height at which the scoop 20 is situated this latter throws it, owing to centrifugal force, against the lid 22, from which it falls into the gutter 12 and is removed therefrom by the scoop 21, which directs it toward the apertures 13 and the discharge-conduits 14. The apparatus thus operates in a continuous manner until the treatment of a portion of the grain having been terminated the vessel is emptied by opening the obturator 11.

What I claim is—

1. In an apparatus of the kind specified, a vessel provided with a central feed, and an inclined lid or cover, means for causing the grain to pass centrally downward within said vessel and upwardly along the sides thereof, means for throwing the grain upwardly against said lid, a peripheral channel at the upper end of said vessel provided with outlet-ports, and means for moving the grain within said channel toward said ports.

2. In an apparatus of the kind specified, a vessel provided centrally with a tube extending into its upper end, a central shaft provided with a screw adapted to move the grain centrally toward the bottom of the vessel, blades upon the inner face of said vessel, a peripheral channel at the upper end of said vessel provided with outlet-ports, a rotatable wing or fan at the upper end of said vessel, a conical lid or cover on said vessel, and a rotatable scraper situated within and adapted to traverse said peripheral channel.

In testimony that I claim the foregoing as my invention I have signed my name in presence of two subscribing witnesses.

GUGLIELMO BIANCHINI.

Witnesses:
 L. FRETTE,
 MICHELE DE DRAGO.